Aug. 29, 1933.  T. S. REESE  1,924,961
PROCESS FOR MOUNTING DECORATIONS
Filed June 2, 1932  2 Sheets-Sheet 1

Inventor
T. S. Reese,
By Richey & Watts
Attorney

Aug. 29, 1933.  T. S. REESE  1,924,961
PROCESS FOR MOUNTING DECORATIONS
Filed June 2, 1932   2 Sheets-Sheet 2

Inventor
T. S. Reese,
By
Rickey & Watts
Attorney

Patented Aug. 29, 1933

1,924,961

UNITED STATES PATENT OFFICE 1,924,961

PROCESS FOR MOUNTING DECORATIONS

Thomas S. Reese, Cleveland, Ohio

Application June 2, 1932. Serial No. 615,065

33 Claims. (Cl. 41—33)

This invention relates to a novel process for the manufacture of decorated objects.

In the manufacture of all kinds of products, the almost universal practice is to provide a suitable surface finish which enhances the attractiveness of the product. Such a result is obtained in many instances by the use of a lacquer, enamel or the like, lamination upon the base or body material. The transfer type of decoration is a desirable one inasmuch as an unlimited variety of colors and figures may be obtained practicably with it. Heretofore, the use of transfer decorations has been very largely confined to signs and the like where the problem of applying the decoration was a comparatively simple one, inexpensively met. It is desirable to employ the transfer decorations in other uses such as in connection with automobiles or structural materials where the materials must be handled according to mass production methods in order to meet the competitive standards in such industries.

Accordingly it is the object of this invention to provide a process using decorative materials of the type adapted to mass production methods in which attractiveness is afforded by decorations either of the transfer type carried upon a supporting backing or by films unsupported by any backing medium.

Another object of the invention is to provide a novel method of applying or transferring decorations of the transfer type or of the unsupported film type to base materials which is adapted to mass production methods. Another object of the invention is to provide a novel method for uniting decorations with base materials which involves the use of a novel union between the decoration and the base material. Another object of the invention is to provide a novel method of uniting decorations to base materials according to mass production methods.

Another object of this invention is to provide methods for uniting prehardened formable decorations and formable base materials and forming the ensemble according to mass production methods.

Another object of this invention is to effect a union between prehardened decorations and base materials by a method involving the use of low vapor pressure solvents for the decoration, which solvents are carried by a bonding medium.

Another object of this invention is to effect a union between prehardened decorations and base materials by a method involving the use of a solvent of low vapor pressure in a bonding medium such as to make and maintain the bonding medium tacky to a degree effective for uniting decorations therewith.

Another object of this invention is to effect a union between a prehardened decoration and a base material by a method involving use of a low vapor pressure solvent in a bonding medium between the base material and the decoration and by the use of elevated temperatures applied to the assembly.

Other objects and advantages of the invention will appear in the following detailed description taken in connection with the accompanying drawings in which:

Fig. 1 is divided into two sheets.

In the manufacture of such objects as automobile panels, garnish mouldings, body exteriors; panels of wall board, plywood, metal, wood, glass; furniture of all types either metal or wood; structural material as window casings, molding, doors, partitions, walls: signs, telephones, refrigerators, radios; leather, cloth, oilcloth, metal, wood, glass, paper and other kinds of material used in various objects; where it is desirable to impart a surface decoration which, for example, may be a highly polished surfaces, solid colors, reproductions of various configurations such as wood grain, marble, tile, geometric designs, etchings, pictures, etched metals, mosaics, closenne, objects and scenes of nature, snake and lizard skins, fur, cloth, laces, needlepoint, or anything that may be photographed; the present invention may be employed.

Efforts have been made in the past to apply decorations to such articles after they have been shaped to their finished form but all such efforts have failed, because of the skilled labor and time which were required to effect the application of the decoration to the surface of the material. In order to render the use of decorations practical for such articles which are to be formed as well as for articles requiring no forming operation, it is desirable that the decoration be applied according to mass production methods. It is desirable to apply the decoration to the material before it has been cut or shaped into its final form inasmuch as the base material is usually of a form which is more amenable to rapid and economical application of decorations than are the various and multitudinous finished forms. Accordingly the problem of determining the kinds and combinations of materials to be used and the process for the use thereof so as to effect the application of decorations to unfinished base materials rapidly, cheaply and reliably presents itself.

Heretofore various methods of applying transfer decorations have been employed. It has been common to mount the transfer decoration either as a film of lithographic ink, or of lacquer bearing a design, or as a film of lacquer and enamel bearing a design, upon a gummed sheet of paper. The exposed face of the transfer film is then coated with a suitable water soluble adhesive and upon soaking the transfer with water, the transfer film may be applied to suitable surface and stripped from the gummed paper. Upon the evaporation of the moisture from the adhesive the transfer design remains in place.

Another method is to build up the transfer decoration in the form of a film of a lacquer or the like upon gummed paper. The gum is water soluble and, upon soaking the paper with water, the transfer film may be slid off the paper onto a suitable surface, the gum remaining on the transfer uniting it to the surface.

Such methods, employing water soluble adhesives, are not amenable to mass production for several reasons. The adhesive would not set up or adhere rapidly enough to be practicable for such methods of manufacture. In addition, the union between the base material and the transfer film is not secure enough for the use to which materials such as furniture, automobile parts, wall panels, window sills and the like are subjected. Also, such transfer films would not be reliable where subjected to moisture. In addition, the co-efficients of expansion with temperature of the adhesive and the transfer film are sufficiently different so as to tend to cause checking when finishing lacquer is applied over the transfer or when it is otherwise further built up.

Still another method of applying transfer films to base material is practised which involves the use of a suitably surfaced base material. When it is desired to apply the transfer film to the surfaced base material, a suitable solvent such as ethyl lactate, is applied to the surfacing substance and/or transfer film in sufficient quantity to soften and to render tacky the substance and film. The transfer film may then be applied to the surfaced base material, the tacky condition thereof effecting a union therebetween. The solvent may be applied as such or in the more usual combination with a suitable diluent, such as water. When the diluted solvent is applied it first acts as a lubricant and the diluent, which is of lower boiling point, vaporizes first and leaves the solvent in increasing concentration at the juxtaposed faces of the surfacing substance and transfer film. The solvent will vaporize leaving the surfacing substance and transfer film cemented together. Water is a convenient diluent in such cases inasmuch as it also assists in effecting the separation of the transfer film from the transfer paper upon which it may be mounted.

Such a method, while it is applicable when the transfer film is subjected to a finishing operation after it has been applied or where the metal is to be formed, is not satisfactory in mass production methods of manufacture. The last described method has the fault that the use of water, either as a diluent or separately for removing the transfer film from the transfer backing, if brought into contact with the transfer backing before application, curls the transfer and creates bubbles in the applied film, thus creating serious obstacles to mass production methods. In addition, union between the transfer film and the base material is not completed with sufficient rapidity to be amenable readily to mass production methods. Furthermore, for best results the degree of dilution of the solvent is a critical condition varying with atmospheric temperatures and pressure thus affording obstacles to the use of this method in mass production.

Still another method of applying transfer films is to coat the base material or the exposed surface of the transfer with a quick drying varnish, enamel, or the like. Such varnish is allowed to dry and, while drying, a degree of tackiness is attained which is efficacious for uniting the transfer film and base material. At that time, the transfer film may be applied. In order to practice such a method it is necessary to permit the varnish or the like to dry until a satisfactory degree of tackiness is attained then the transfer film must be applied immediately inasmuch as further drying of the varnish continues at a comparatively rapid rate so that the surface will soon pass beyond the condition of proper tackiness to receive the transfer film. Where the transfer film is applied by hand it is practical to observe the condition of the surface and to apply the transfer film at the proper time. However, the degree of tackiness which is essential for proper application of the transfer film is a condition which is entirely too critical to permit such process to be used in mass production methods where the time of application of the transfer film is contingent upon and must proceed according to other factors than the degree of tackiness of the varnish at the moment. In addition such varnishes are usually of the type which harden by oxidation and polymerization and, when a finish coat of lacquer is sprayed over the transfer film, it will strike through the transfer film and cause the film to "lift" or crinkle.

According to this invention, the decoration is united to the base material by a bonding medium which has that degree of tackiness and the capacity to retain that degree of tackiness that is necessary properly to unite with the decoration and the capacity to retain that degree of tackiness for a length of time ample to accommodate any variations in the time of application of the decoration to the base material which may be incident to the manufacturing process. Such a bonding medium for uniting the decoration to the base material also may constitute a primer surfacer, filler, or any other covering medium up to and including finishing coats for the base material. The bonding medium may be either of the cellulose type, such as lacquer; the drying oil type, either alone or in combination with natural and/or synthetic resins; synthetic resins; or combinations thereof. A bonding medium of the lacquer type, which has been used in the past as a coating for a base material, may be composed of a cellulose ester, a resin, a solvent of high vapor pressure, a diluent, a plasticizer, a pigment or dye. When such a lacquer is applied the diluent and solvents evaporate leaving the resins, cellulose ester, plasticizer and pigment in the form of a hard dry material to which the transfer may be united by suitable cement, according to prior art practices. According to this invention, the lacquer may have, in addition to the ingredients above enumerated, solvents, with or without diluent, of low vapor pressure. By adding such a solvent of low vapor pressure the lacquer when applied will lose by vaporization the high and medium vapor pressure solvents and diluents, the low vapor pressure solvents and diluents remaining in the lacquer for a relatively great length of time. It is evident that, by properly proportioning the amount of low vapor pressure solvents and diluents with respect to the other ingredients, after the high and medium vapor pressure solvents and diluents have left the lacquer, thus quickly attaining a predetermined degree of tackiness, since, at ordinary temperatures, the low vapor pressure solvents and diluents evaporate very slowly, the lacquer will retain that degree of tackiness over a considerable period of time. Thus a bonding medium for uniting a decoration to a base material which affords the necesary degree of tackiness and which is not critical with respect to that degree of tackiness is provided. As hereinbefore made evident, the bonding medium for uniting the decoration and the base material may also serve as a primer surfacer, filler, or any of the finishing coats. The low vapor pressure solvents and diluents improve the composition of the bonding medium since the presence of the low vapor pressure solvent and diluents maintain the composition fluent over a considerable period of time so that even flowing out of the bonding medium, to provide a uniform surface and to avoid "orange peel" or like, is insured.

While a satisfactory union between the bonding medium and the decoration may be obtained solely by the mechanical adhesive action of the bonding medium, it is highly desirable that the low vapor pressure solvent or solvents or the combination of low vapor pressure solvent and diluent be such as to have a solvent action on the material of the decoration. Such a solvent action on the material of the decoration by the low vapor pressure solvents and diluents carried in the bonding medium not only causes a more secure union between bonding medium and the decoration but it will soften the decoration, thereby causing the decoration to accommodate itself to all surface contours. Also due the fact that the low vapor pressure solvents and diluents have a solvent action upon the substance of the decoration they will permeate the substance of the decoration, and escape from the surface thereof. When a decoration is laid down upon a bonding medium, either by the method of this invention or by other methods, formation of bubbles between the decoration and the bonding medium usually occurs such bubbles being formed by entrapped air. According to this invention, the subsequent vaporization of the low vapor pressure solvents and diluents at elevated temperatures will entrain the entrapped air and carry the same through the substance of the decoration to be dissipated at the exposed surface of the decoration. Thus the decoration is caused to lie down or settle into intimate contact with the bonding medium throughout the whole area thereof. Thus by employing the low vapor pressure solvents and diluents in the bonding medium, not only is a secure union between the decoration and bonding medium secured but also a perfect application of the decoration to the surface of the bonding medium is assured. Thus the necessity for employing meticulous methods and highly skilled labor for effecting the proper application of the decoration to the bonding medium is rendered unnecessary and the method of this invention made more amenable to mass production methods where exacting conditions in the application of the decoration and the bonding medium are undesirable.

The materials which may be employed as low vapor pressure solvents are many. While the boiling point of such solvents is a helpful criterion in defining the class of solvents which may be drawn upon for the purpose of this invention, the boiling point is not a reliable criterion in all cases. It is the vapor pressure at ordinary operating temperatures which determines the rate at which the solvent will leave the bonding medium. The vapor pressures at ordinary operating temperatures of such solvents as have a comparatively low boiling point, in some instances, may be low enough to be useful as the low vapor pressure solvents employed according to this invention. Thus the group of materials which may be employed as the low vapor pressure solvents may be defined by representative examples of such solvents, it being understood that other solvents which would perform the functions of the solvents of the following list, are equivalents for those included in the following list. A few suitable low vapor pressure solvents are:

| | |
|---|---|
| Di-ethyl oxalate | B. P. 185° C. |
| Di-methyl-cyclohexanyl adipate | B. R. 225°–232° C. |
| Di-cyclohexanyl adipate | B. P. 212° C. |
| Dichlorethyl ether | B. P. 178° C. |
| Furfuryl acetate | B. P. 175° C. |
| Tetrahydro furfuryl alcohol | B. P. 177° C. |
| Acetophenone | B. R. 200°–202° C. |
| Diethylene glycol monoethyl ether (carbitol) | B. R. 175°–200° C. |
| Cyclohexanyl acetate | B. R. 170°–180° C. |
| Methylcyclohexanol | B. R. 160°–180° C. |
| Cyclohexanone | B. R. 150°–160° C. |
| Methylcyclohexanone | B. R. 160°–170° C. |
| Benzyl alcohol (boiling range) | B. R. 200°–210° C. |
| Benzyl formate | B. R. 200°–202° C. |
| Benzyl acetate | B. R. 215°–218° C. |
| Butyl lactate | B. R. 185°–195° C. |
| Amyl lactate | B. R. 210° C. |
| Ethyl benzoate | B. R. 212°–215° C. |
| Ethylene glycol di-acetate | B. R. 186°–190° C. |
| Ethylene glycolmono-N-butyl ether | B. R. 163°–174° C. |
| Cymene-para | B. P. 175°–177° C. |
| Tetrahydronaphthalene | B. R. 205°–215° C. |
| Decahydronaphthalene | B. R. 189°–191° C. |

The selection of a low vapor pressure solvent in any particular instance is determined by many factors such as the nature of the base material, the nature of the ingredients of the bonding medium, and the nature of the decoration. It is desirable that the low vapor pressure solvent not only have a solvent action upon at least some of the constituents of the bonding medium, but also that such solvent be compatible with or maintain other constituents in suspension so that precipitation may not occur. In the case of the cellulose ester type bonding mediums it is common practice to carry a solvent type plasticizer as for instance, tricresyl phosphate or diamylphthalate which remains permanently in the bonding medium. When this type of bonding medium is used the solvent type plasticizer may be sufficient to avoid any precipitation even if the low vapor pressure solvents and diluents are not solvents for any of the constituents of the bonding medium. Such may also be the case with other types of bonding mediums such as synthetic resin types. However, it may be found desirable in certain instances to employ a low boiling point fluid as the medium for the disperse phase of an emulsion or suspension containing the other ingredients making up the bonding medium, or the low vapor pressure fluid may serve as a solvent or diluent for some of the ingredients of the bonding medium and as the disperse phase of an emulsion or suspension of other ingredients.

In order to reduce the cost of the low vapor pressure solvent it may be desirable to add a diluent for the low vapor pressure solvent in the bonding medium, said diluent not destroying the solvent action. Such diluents may be of slightly higher vapor pressure than the solvent in order that during vaporization an excess concentration of diluent such as to cause precipitation of ingredients of the bonding medium may not occur. A diluent for the low vapor pressure solvent may be such as to have a solvent action on the substance of the decoration, where the bonding medium and the decoration of are different composition, in which case the low vapor pressure solvent may or may not have a solvent action on the substance of the decoration. If a diluent for the low vapor pressure solvent, but having a solvent action on the substance of the decoration, be used with a low vapor pressure solvent having no solvent action on the decoration, then it is desirable that the diluent and low vapor pressure solvent form constant boiling point mixtures so that neither precipitation of any ingredients of the bonding medium nor locking of any low vapor pressure solvent beneath the decoration shall occur. Some example of low vapor pressure diluents are:

Solvent naptha (coal tar heavy grade) ____________ B. R. 160°–190° C.
Mineral spirits ____________ B. R. 190°–200° C.
Lacquer petroleum ____________ B. R. 200°–220° C.

In addition the rate of evaporation of the low vapor pressure solvent is affected by the kind and amounts of other ingredients combined therewith which is one of the factors to be taken into consideration in selecting such solvent in any particular case. The low vapor pressure solvent may perform other functions such as replacing, wholly or in part either or both of the high and medium vapor pressure solvents. The low vapor pressure solvents may provide, in some degree, properties of a plasticizer. The range of boiling point temperatures suggestive of such low vapor pressure solvents may be from 170° to 300° C. The upper limit of boiling point is largely determined by the temperature to which the decoration may be heated without impairing it.

The low vapor pressure solvent may have the additional functions of retarding oxidation and polymerization where the bonding medium contains ingredients which undergo such changes amyl borate, diethylene glycol mono-ethyl ether, and benzyl alcohol have such retarding effects.

While the invention has been described in connection with cellulose lacquer types of bonding mediums it may be practiced effectively with bonding mediums composed of natural and/or synthetic resins, with or without oils. The low vapor pressure fluid may not only serve as a solvent or diluent in bonding mediums but also as a disperse medium for a suspension of emulsion according the nature of the bonding medium.

In some cases, the presence of the low vapor pressure fluid may operate to retard oxidation and or polymerization of the resins and oils in order to attain and retain a suitable degree of tackiness. Here again, the low vapor pressure fluid chosen is determined not only by its rate of evaporation but also by the nature of materials combined therewith.

The low vapor pressure fluid may be a mixture of a plurality of solvents. Such a mixture may be an asetropic one. Asetropic mixtures of appropriate vapor pressure may be composed of solvents which per se might not be useful for the purpose of this invention. The choice of fluid may be determined in practice by one skilled in the art in much the same manner that differently colored mediums are combined to obtain a desired tint. The low vapor pressure solvent while preferably a fluid, may be a solid such as triacetin.

The bonding medium may be thought of as comprising a body material made up of those solid constituents which eventually are deposited upon a base material to form a solid film and solvents which, in this instance, will include a low vapor pressure solvent as well as those solvents which regularly are used in common practice.

The following are examples of some suitable compositions for bonding mediums:

For a cellulose ester and synthetic resin type to unite a decoration to metal, glass or the like:

| | Parts of weight |
|---|---|
| R. S. ½° nitrocellulose | 2 |
| Ester gum | ½ |
| Diamylphthalate | 1¼ |
| Glycerol phthalate resin | 1 |
| Ferrite yellow | 2 |
| Butyl acetate | 2 |
| Ethyl acetate | 2 |
| Butanol | 1 |
| Ethyl lactate | 1 |
| Toluol | 9¼ |
| Butyl carbitol | 1½ |

The pigment is ground by any suitable method into the solution of nitrocellulose and resins.

For a cellulose ester and natural resin type to unite a decoration to wood, artificial wall board or the like:

| | Parts of weight |
|---|---|
| R. S. ½° nitrocellulose | 2 |
| Dewaxed dammargum | 3 |
| Dibutyl phthalate | ½ |
| Blown castor oil | ½ |
| Titanium dioxide | 2½ |
| Butyl acetate | 2 |
| Ethyl acetate | 2 |
| Butanol | 1 |
| Ethyl lactate | 1 |
| Toluol | 9¼ |
| Benzyl alcohol | 1½ |

Teglac is the trade name for a resin of the glycerol phthalate condensation type modified with rosin.

For a bonding medium using synthetic resins and oils to unite a decoration to metal and which may be formed after assembly:

| | Parts of weight |
|---|---|
| Tung oil | 2 |
| Bakelite XR-254 | 1 |
| Turpentine | ½ |
| Mineral spirits | 1½ |
| Diethylphthalate | ¼ |
| Titanium dioxide | 3 |
| Benzyl alcohol | ⅜ |

Bakelite is the trade name for a resinous phenol formaldehyde condensation product.

Heat the bakelite XR-254 and oil together to 450° Fahrenheit. Hold for 15 minutes, then thin immediately with the turpentine and mineral spirits. On cooling, add the diethylphthalate and the titanium dioxide and grind by any suitable method.

For a synthetic resin bonding medium useful to unite a decoration to wallboard, plywood, wood, glass, metal and the like:

| | Parts of weight |
|---|---|
| Rezyl 110 | 2 |
| Titanium dioxide | 2 |
| Whiting | 7 |
| Cobalt linoleate, using .04% metal content | 1/16 |
| V. M. and P. naphtha | 2 |
| Xylene | 2 |
| Butyl carbitol | 7/8 |

Rezyl 110 is a resinous glycerine phthalate condensation product modified with oils in manufacture.

A bonding medium suitable for uniting decorations to leather, cloth, paper or the like.

| | Parts of weight |
|---|---|
| R. S. ½° nitrocellulose | 2 |
| Rezyl balsam | 5 |
| No. 337—33 | 3 |
| Titanium dioxide | 2 |
| Butyl acetate | 2 |
| Ethyl acetate | 2 |
| Ethyl lactate | 1 |
| Toluol | 11½ |
| Carbitol | 7/8 |

The rezyl balsam is a glycerine phthalate condensation resin.

A formula for a bonding medium suitable for uniting a decoration to wood, metal etc., of the natural resin and oil type is as follows:

| | Parts of weight |
|---|---|
| Ester gum | 14 |
| Linseed oil | 8½ |
| Tung oil | 5½ |
| Carbitol (ethylene glycol monoethyl ether) | 4½ |
| Turpentine | 15 |
| Varnolene | 13 |

Run the ester gum and oils, then thin with the turpentine and varnolene. Then add the carbitol.

A suitable formula for a bonding medium for uniting a decoration to plywood, wall board, etc., of the cellulose lacquer type would be:

| | Parts of weight |
|---|---|
| Cellulose acetate (5° viscosity) | 2 |
| Santacizer #8 (ethylated toluene sulphone animid) | 1 |
| Tricrezyl phosphate | 1 |
| Ferrite yellow | 1½ |
| Acetone | 3 |
| Methyl cellosolve | 5 |
| Diacetone alcohol | 2 |
| Benzol | 3 |
| Toluol | 7 |
| Benzyl alcohol | 14 |

It will be observed that the bonding mediums are similar in composition to both priming and finishing lacquers in present day use, the low vapor pressure solvent being a solvent for some at least of the ingredients of the bonding mediums. Accordingly where the decoration to be united with a base material which already carries one or more priming and/or finishing coats, the low vapor pressure solvent carried by the bonding medium may have a solvent action upon such priming or finishing coats as may be present on the base material.

Figure 1:
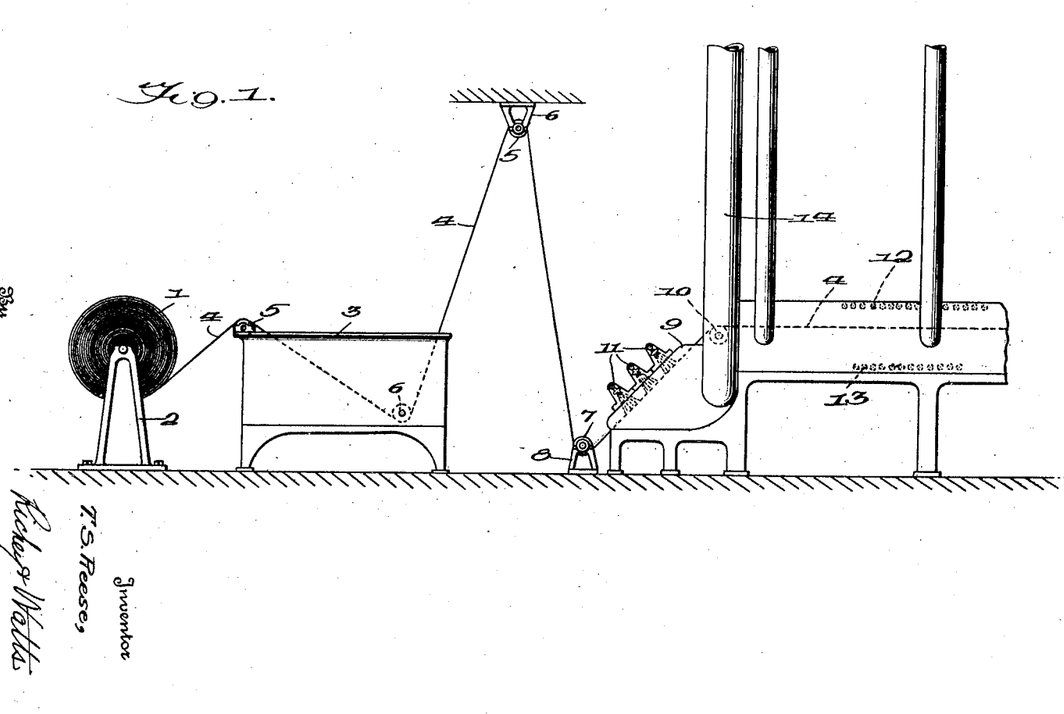
Fig. 1 is a view in side elevation of the apparatus for affording the objects of the present invention.

According to this invention a novel bonding medium has been provided which has the characteristic that it attains and retains a degree of tackiness essential to a secure union between the decoration and the base material. By using such a bonding medium the process of applying the decoration to the base material may be carried out by mass production methods. A suitable apparatus for effecting that operation is illustrated in the drawings. In that form of apparatus a transfer type of decoration is applied continuously to strip steel. Strip steel may be provided in the form of a coil 1 carried on any suitable standard 2 so as to be freely rotatable. In order that the bonding medium may form a secure bond with the metal it is desirable to prepare the surfaces of the steel for the application of the bonding medium. Usually the only operation is to clean the surface of the steel and that may be accomplished by a suitable degreasing unit 3 which may be of any suitable conventional type through which the steel strip 4 may be passed continuously over rollers 5 or 6 or the like. The unit 3 will remove grease and oil from the surface of the steel. It may be desirable to sand blast the surface of the steel in order to remove other foreign material in addition to grease and oil. Such unit is not shown in the drawings of the present case and if it be found desirable it may replace the degreasing unit 3. The sand blast roughens the surface of the metal and results in a better bond with the bonding medium.

Many forms of degreasing units operate at elevated temperatures so that strip steel 4 may leave the degreasing unit 3 at an elevated temperature. Accordingly the strip of steel 4 may be trained over a roller 5 carried upon a suitable bracket 6 in order to dissipate the heat and thus lower the temperature of the steel. The steel is then in condition to receive the bonding medium. Inasmuch as the bonding medium necessarily must be applied it is convenient to include pigments or dyes in it to provide a background color which makes up one color of the transfer decoration. In order to apply the bonding medium, the strip steel 4 may be carried beneath the roller 7 rotatably mounted in a suitable bracket 8 and through a spraying machine 9, over roller 10 rotatably mounted therein. In the spraying machine 9, suitable pipe connections and nozzles 11 are provided which spray the bonding medium onto the strip steel as the strip passes continuously therethrough. While it is convenient to combine the bonding medium and pigments into one medium obviously a primer may be applied to the steel and dried in a suitable manner before the application of the bonding medium in which case a suitable machine for spraying a primer onto the steel may be provided together with a heating unit for drying it preliminary to the application of the bonding medium. Also the color of the decoration may be provided solely by the decoration itself and not by the bonding medium. The bonding medium applied in the spraying machine 9 contains the more volatile solvents as well as low vapor pressure solvent, mixture of solvents, or combination of solvents and diluents or disperse phases, and, in order to quickly render the film tacky, it is desirable to eliminate the more volatile solvents rapidly. Accordingly, the strip steel 4 having the film of bonding medium thereon is passed through a drying tunnel 12, which may be heated by suitable steam coils 13 or in any other suitable manner if desired, so as rapidly to volatilize the high and medium vapor pressure solvents and diluents. Suitable stacks 14 are provided for conducting away the vapors. Forced draft in this tunnel 12 may hasten the drying action. As the strip steel 4 leaves the drying tunnel 12 the film thereon has the desired degree of tackiness and, due to the presence of the low vapor pressure solvents, it will retain that tackiness for a considerable period of time, at ordinary temperatures that is, several hours or more. Therefore, at the time the steel leaves the drying tunnel it is in condition to receive the transfer.

The decoration is of the transfer type having a film carrying a printed or lithographed design which may be arranged in the form of a coiled strip 15. The coil 15 is journalled in suitable bearings 16 so that the transfer strip 17 may be drawn therefrom and passed over rollers 18 and 19 which smooth and tension the transfer strip. The transfer strip 17 and the steel strip 4 with the tacky bonding medium thereon are simultaneously fed through squeeze rollers 20 which may be of any suitable material and may have rubber on the faces thereof. The strip steel and the transfer strip pass between lateral guides 21 which insure that the two strips will be properly superimposed. The steel strip is advanced into the squeeze rollers 20 with the transfer strip on the uppermost surface thereof as shown in the drawings. The transfer strip is fed between rollers 20 with the transfer film juxtaposed to the bonding medium carried on the strip steel. When the strips are pressed together between rollers 20 a union is formed between the steel and the transfer film by the adhesive action of the bonding medium.

After the strip steel and the transfer film have been united it is then desirable to remove the paper backing from the transfer film. Accordingly the composite strip 22, as it leaves the squeeze rollers 20, passes over roller 23 down into water bath 24 guided by rollers 25, 26 and 27 journalled in the water tank. Water bath 24 may be heated to a proper temperature according to the nature of the water soluble gum joining the transfer films and paper and the rate of travel of the composite strip. The immersion of the composite strip in the water bath 24 dissolves the water soluble gum between the transfer film and the paper so that the paper may be readily and easily stripped off. The paper may then be trained over rollers 27 and 28 and reeled up in a suitable coil 29 journalled in a bracket 30. Wheels 31 driven from a suitable source of power may be provided to turn the reel 29 to take up the paper. The wheels 31 may engage the coil of paper 29 frictionally at the periphery thereof. While the single strip of paper backing for the transfer film may be used it is found convenient to use a transfer having a strip of rice paper interposed between the heavier paper backing and the transfer film which facilitates the separation of the paper and the transfer, such paper being known as duplex paper, a trade name. The heavier paper backing may be stripped off and reeled up as the composite strip leaves the squeeze rollers. The auxiliary paper strip which is carried over with the transfer film, along with whatever gum adhering to the surface of the transfer film, may be removed by water sprays 32 arranged in the path 33 through which the composite strip is trained, by passing over rollers 34 and 35 suitably mounted for rotation. The water sprays 32 wash the surface of the transfer film or decoration clean of gum and paper.

After the composite strip leaves the bath 33, through wringer rollers 38 to remove excess water, it is then ready to be baked at elevated temperature in order to complete the secure union between the bonding medium, the metal, and the decoration, and to drive out the remaining solvent and diluent, or disperse phase. An approximate range of baking temperatures is from 185° to 375° C. depending on the materials used.

To conveniently effect the baking operation, the composite strip, as it leaves the bath 33, may be cut to lengths and automatically carried to an oven on suitable conveyors. Alternatively the composite strip may be coiled on a reel 36 provided with spacing pins 37 which automatically space successive turns of the coil from one another. The reel 36 may be power driven and serve to draw the strip through the machine. Other power units operating upon the strip, as by means of rollers engaging the edges of the strip, may be provided wherever desired throughout the machine for moving the strip therethrough. When a reel of the composite strip has been completed it may then be transferred to a suitable oven for baking. Baking takes place at or about atmospheric pressure as is usual in baking in a conventional oven. Forced draft may cause the pressure within the oven to depart somewhat from atmospheric pressure.

The apparatus described serves as an illustration of many possible devices for carrying out the process of this invention. Various base materials, some of which have been mentioned hereinbefore, may be decorated according to this invention, details of the process and the construction of arrangement of the machinery being modified as may be made necessary by the character of the base material as to physical properties, chemical constitution and structural form. Thus sheet metal, bar stock, wall board, lumber, leather in various form, paper, rubber, tin foil, glass, et cetera may have a decoration applied thereto according to the process of this invention and that process may be practiced in a continuous manner as outlined hereinbefore or the various steps may be isolated in sequence and time.

The bonding medium of this invention may be any of a variety of compositions as indicated hereinbefore. The bonding medium may be applied in any of a variety of ways according to the base material and the circumstances incident the application of the decoration. The continuous process of applying the bonding medium is but one example, it being intended to include all well-known methods of applying bonding mediums to base materials within the purview of this invention.

Hereinbefore, the invention has been exemplified by the step of applying a bonding medium to a base material, the decoration being applied thereafter. It is practicable and, in some instances, it may be desirable to apply the bonding medium to the decoration. In such case the low vapor pressure fluid is employed to maintain the bonding medium tacky, after other fluids have been eliminated therefrom, so that the decoration and bonding medium may readily be united with the base material. In all other respects the invention in its mode of operation, and results attained, as like that hereinbefore described in connection with the application of the bonding medium in fluid form to the base material, followed by the application of the decoration.

Also, it is practicable and may be desirable, in some instances, to first apply a bonding medium to a base material or to a decoration, the bonding medium not containing a low vapor pressure solvent, and to subject the applied bonding medium to a low vapor pressure solvent which may be taken up by the bonding medium. The low vapor pressure solvent may be introduced to the bonding medium by carrying the solvent either on the base material or the decoration and by carrying the bonding medium on the other of those two elements.

The decoration employed in the practice of this invention may take any of a variety of forms, and may be composed of any of a variety of substances.

The decoration may be of the supported type known as the transfer decoration where a paper or like backing medium is provided to afford support, temporarily for a decorative film carried thereby. The decorative film is held on the backing by a water soluble gum or the like. The decorative film may be an ink printed, lithographed, or rotogravured onto the gum side of the transfer paper. Any ink film, continuous or not, is porous and would permit the escape of low vapor pressure fluid from the bonding medium, to which it is applied, regardless of solvent action on the substance of the ink. However, the advantage of attaining and maintaining a predetermined degree of tackiness in the bonding mediums is present in this case.

The supported decorative film may be of the type exemplified by lacquer films deposited from solution onto the gum side of transfer paper. Such films may afford decorative value by a polished surface alone or with coloring embodied therein. Such films may be deposited in one or more coats as desired. Designs may be incorporated with the film, with or without the color and/or polish. Designs may be printed, lithographed, rotogravured, stenciled or otherwise formed and applied either onto the gum side of transfer paper or onto the exposed surface of a lacquer or like film laid upon the gum side of transfer paper. Where the design is applied to the gum, a film of lacquer or the like may be laid down over the design, the substance of the film, taking up, and incorporating therewith, the design. The exposed surface of the film may then be applied to the bonding medium, the transfer paper removed with the aid of water; and a finishing lacquer or the like laid down thereover. Or, the transfer may be moistened with water, the film slid off and applied to the bonding medium with the design bearing face in contact therewith. Where the design is applied to a lacquer or like film on the transfer paper; the exposed surface of the film may be applied to the bonding medium and the transfer backing removed; or, an additional film of lacquer or the like may be laid down on the first film over the design, the exposed surface of the second film applied to the bonding medium, and the transfer backing removed. The various lacquer type films may be clear or may carry coloring material, and, in the case of films laid down over designs, the film may carry an opaque background color.

The decorations may be made of various substances, within the purview of this invention.

Inks of the printing, lithographing, and rotogravuring types may be employed. The constitution of those inks are known to the art so as to render description thereof superfluous.

Lacquer type films or the like hereinbefore mentioned may have any of a wide variety of compositions. Typical of the lacquer type films are those having as essential or characteristic ingredients, cellulose esters and plasticizer, cellulose esters and placticizers and resins, cellulose esters and resins, synthetic resins, resins and oil.

Typical formulæ exemplifying the above listed lacquer type films are as follows:

1. A formula of the cellulose ester and plasticizer types:

| | Parts of weight |
|---|---|
| Cellulose acetate—½° viscosity | 1 |
| Cellulose acetate—20° viscosity | 1 |
| Santacizer #8 (ethylated toluene sulphone anamid) | 1 |
| Diethylphthalate | 1 |
| Toluol | 10 |
| Acetone | 3 |
| Methyl cellosolve | 5 |
| Diacetone alcohol | 2 |

2. Another formula of the cellulose ester and plasticizer type employing pyroxylin:

| | Parts of weight |
|---|---|
| 20–30° Lacquer cotton | 1 |
| ½° Lacquer cotton | 1 |
| Blown Castor oil | 1 |
| Tricresyl phosphate | 1 |
| Toluol | 13.44 |
| Ethyl acetate | 4.48 |
| Butyl acetate | 4.48 |
| Butanol | 2.24 |

3. A formula suitable for the transfer film of the ester, plasticizer and resin type:

| | Parts of weight |
|---|---|
| R.S. 20–30° laquer cotton | 1 |
| R.S. ½° lacquer cotton | 1 |
| Dammar gum | 1 |
| Diamylphthalate | 1 |
| Blown castor oil | 1 |
| Toluol | 13.44 |
| Butyl alcohol | 3.36 |
| Ethyl acetate | 3.36 |
| Cellosolve | 1.12 |
| Butyl cellosolve | 1.12 |

Cellosolve of the above formula is the trade name for a solvent composed of ethylene-glycol-mono-ethyl-ether.

4. Another suitable transfer film formula of the cellulose ester, plasticizer and resin type employs the acetate instead of the pyroxylin is as follows:

| | Parts of weight |
|---|---|
| ½° cellulose acetate | 1 |
| 20° cellulose acetate | 1 |
| Rezyl #337-2 (glycerol phthalate condensation product) | 1 |
| Diethylphthalate | 1 |
| Triacetin | 1 |
| Toluol | 10 |
| Acetone | 3 |
| Methyl cellosolve | 5 |
| Diacetone alcohol | 2 |

The Rezyl is a trade name for a resin the chemical nature of which is indicated.

5. Another suitable transfer film formula of the cellulose ester resin type employing pyroxylin is as follows:

| | Parts of weight |
|---|---|
| R.S. ½° nitro-cellulose | 2 |
| Rezyl balsam #337-33-2 | 3 |
| Butyl acetate | 2 |
| Ethyl acetate | 2 |
| Butanol | 1 |
| Ethyl lactate | 1 |
| Toluol | 9¼ |

6. Another suitable formula for the transfer film of the synthetic resin type is as follows:

| | Parts of weight |
|---|---|
| Rezyl #113 solution (60% rezyl #113—40% xylene) | 2 |
| Hi-flash naphtha | 1 |
| Mineral spirits | 1 |
| Mixed dryer, containing .4% lead; .05% manganese; .03% cobalt; based on the weight of the rezyl #113. | |

7. A formula for the transfer film of the synthetic resin with oil type is as follows:

| | Parts of weight |
|---|---|
| Bakelite XR-254 | 9 |
| Ester gum | 1 |
| Tung oil | 20 |
| Bodied linseed oil | 4 |
| Mineral spirits | 2 |
| Xylol | 15 |

Run the bakelite, ester gum and oils at 450° Fahrenheit for 30 minutes and thin down with mineral spirits and toluol. Add 6 oz. liquid cobalt dryer.

8. A formula for the transfer film of the natural resin and oil type is as follows:

| | Parts of weight |
|---|---|
| Ester gum | 28½ |
| Linseed oil | 17 |
| Tung oil | 11½ |

Run the ester gum and oils and thin with 30# turpentine and 25# mineral spirits.

The decoration also may be of the unsupported film type. Here a "lacquer type" film is prepared, the film having sufficient strength to permit handling without the aid of any backing support joined therewith. Such a film may have a design formed thereon by printing, lithographing, rotogravuring, stencilling, or in any other suitable manner and the film may be united with the bonding medium at either surface thereof. If the film should be united with the bonding medium with the design exposed an additional finish coating may be laid down thereover. In any case, additional finish coatings may be laid down over an applied film. Also, an unsupported film may have a design formed on one surface thereof and either another unsupported film united therewith, by cementing or otherwise, at the design bearing surface, or, a film may be laid down from solution on a design bearing surface of an unsupported film. Such a built-up film may then be united with a bonding medium, as herein disclosed, at either surface of the film. None, some, or all of the films may carry color which may vary from transparent to opaque.

Suitable unsupported decorative films for the practice of this invention are exemplified by celluloid, (nitrocellulose and camphor) and kodapak, a trade name for a cellulose acetate film.

The decoration may not only be applied to the bonding medium in the manner set forth hereinbefore by way of illustration but also in any well-known manner known to the trade. The decoration may be applied to formed articles and on variously shaped surfaces. Such practise of the invention, in its broader aspects, retain the advantages which accrue from the use of the low vapor pressure fluid in the bonding medium.

This invention finds many practical uses where the decoration is applied to unformed stock in flat, or similar simple forms as cylindrical surfaces, and the decorated stock is then formed and otherwise handled in conventional manufacturing ways so as to produce finished articles. Bonding mediums and decorations of any of the types herein disclosed may be employed so to practice this invention. The bakelite bonding medium formula and the nitrocellulose and rezyl balsam decorative film are examples of substances which may be employed successfully to practice this invention including the forming of decorated base material.

Polishing operations may be practiced on the decorative films after united with the base material.

The term low vapor pressure solvent used in the claims is hereby defined as solvents such as listed on pages 10 and 11 of this specification and their equivalents as determined by vapor pressure.

While certain embodiments of this invention have been described in detail by way of illustration, it is not intended so to limit the invention, it being intended to include all equivalents for the invention as disclosed which fall within the scope of the following claims.

What I claim is as follows:

1. In the art of decorating the steps of preparing a bonding medium containing a body material and a low vapor pressure solvent, uniting a decoration and a base material by interposing said bonding medium therebetween and by bringing the bonding medium and the decoration into contact one with the other, said solvent boiling within the temperature range of 150° to 225° C., said solvent being a solvent for the bonding medium and the decoration, and baking the ensemble at substantially atmospheric pressure.

2. Uniting decorations and base materials by application of a bonding medium to a base material, said bonding medium carrying a low vapor pressure solvent boiling within the temperature range of 150° to 225° C. for the decoration, applying a decoration to the bonding medium in contact therewith, and baking the ensemble at substantially atmospheric pressure.

3. Uniting decorations and base materials by application of a bonding medium to a decoration, said bonding medium comprising a body material and a low vapor pressure solvent boiling within the temperature range of 150° to 225° C. for the decoration, uniting the base material and the bonding medium and baking the ensemble at substantially atmospheric pressure.

4. Uniting decorations and base materials by application of a bonding medium in fluid form to a base material, said bonding medium carrying a low vapor pressure solvent boiling within the temperature range of 150° to 225° C., eliminating from the bonding medium substances of substantially higher vapor pressure than said solvent, said solvent being present in quantities sufficient to maintain the bonding medium tacky, applying a decoration to the bonding medium in contact therewith, and baking the ensemble at substantially atmospheric pressure.

5. Uniting decorations and base materials by application of a bonding medium in fluid form to a decoration, said bonding medium carrying a low vapor pressure solvent boiling within the temperature range of 150° to 225° C., eliminating from the bonding medium substances of substantially higher vapor pressure than said solvent, said solvent being present in quantities sufficient to maintain the bonding medium tacky, uniting the base material and the bonding medium, and baking the ensemble at substantially atmospheric pressure.

6. In the art of decorating, the steps of preparing a bonding medium containing a body material and a low vapor pressure solvent, uniting decorations to base materials by interposing said bonding medium therebetween and arranging the decoration and bonding medium in contact one with the other, said bonding medium being suitable for forming in set condition, said solvent of low vapor pressure boiling within the temperature range of 150° to 225° C. and being present in quantities sufficient to maintain the bonding medium tacky, baking the ensemble at substantially atmospheric pressure, forming the ensemble.

7. In the art of decorating, the steps of preparing a bonding medium containing a body material and a low vapor pressure solvent, uniting an ink transfer decoration and a base material by interposing said bonding medium therebetween and arranging the bonding medium and the decoration in contact one with the other, said low vapor pressure solvent being a solvent for the bonding medium, said solvent boiling within the temperature range of 150° to 225° C., and being present in quantities sufficient to maintain the bonding medium tacky, and baking the ensemble at substantially atmospheric pressure.

8. In the art of decorating, the steps of preparing a bonding medium containing a body material and a low vapor pressure solvent, uniting a lacquer type decoration and a base material by interposing said bonding medium therebetween and by arranging the bonding medium and the decoration in contact one with the other, said low vapor pressure solvent being a solvent for the decoration and the bonding medium, said solvent boiling within the temperature range of 150° to 225° C. and being present in quantities sufficient to maintain the bonding medium tacky, and baking the ensemble at substantially atmospheric pressure.

9. In the art of decorating, the steps of preparing a bonding medium containing a body material and a low vapor pressure solvent, uniting an unsupported film decoration and a base material by interposing said bonding medium therebetween and arranging the decoration and bonding medium in contact one with the other, said low vapor pressure solvent being a solvent for the decoration and the bonding medium, said solvent boiling within the temperature range of 150° to 225° C. and being present in quantities sufficient to maintain the bonding medium tacky, and baking the ensemble at substantially atmospheric pressure.

10. In the art of decorating, the steps of preparing a bonding medium containing a body material and a low vapor pressure solvent, uniting an unsupported cellulose acetate film decoration and a base material by interposing said bonding medium therebetween and by arranging the decoration and bonding medium in contact one with the other, said low vapor pressure solvent being a solvent for the decoration and the bonding medium, said solvent boiling between 150° to 225° C. and being present in quantities sufficient to maintain the bonding medium tacky, and baking the ensemble at substantially atmospheric pressure.

11. In the art of decorating, the steps of preparing a bonding medium containing a body material and a low vapor pressure solvent, uniting an unsupported pyroxylin film derocation and a base material by interposing said bonding medium therebetween and by arranging the decoration and the bonding medium in contact one with the other, said low vapor pressure solvent being a solvent for the pyroxylin, said solvent boiling between 150° to 225° C. and being present in quantities sufficient to maintain the bonding medium tacky and baking the ensemble at substantially atmospheric pressure.

12. In the art of manufacturing decorated objects the steps of: combining a bonding medium carrying a low vapor pressure solvent boiling between 150° to 225° C. for the decoration with sheet metal, applying the decoration to the bonding medium while the solvent is present, and baking at substantially atmospheric pressure.

13. In the art of manufacturing decorated objects the steps of: applying a bonding medium carrying a low vapor pressure solvent boiling between 150° to 225° C. for the decoration to sheet material, eliminating volatile constituents of the medium excepting the low vapor pressure solvent, bring the decoration and the bonding medium in contact one with the other, baking at substantially atmospheric pressure.

14. In the art of manufacturing decorated objects the steps of: applying a bonding medium carrying a low vapor pressure solvent boiling between 150° to 225° C. for the medium to base material, eliminating volatile constituents of the bonding medium excepting the low vapor pressure solvent, said solvent being present in quantities sufficient to maintain the bonding medium tacky, bringing the bonding medium and the decoration in contact one with the other, baking at substantially atmospheric pressure.

15. In the art of manufacturing decorated objects the steps of: preparing a bonding medium comprising a body material and a low vapor pressure solvent boiling between 150° to 225° C. for the decoration and the bonding medium, laminating a base material and a transfer decoration with said bonding medium interposed between and in contact with the decoration, removing the transfer backing from the decoration and baking at substantially atmospheric pressure, said solvent being present in quantities sufficient to maintain the bonding medium tacky.

16. In the art of manufacturing decorated objects the steps of: preparing a bonding medium having embodied therewith a low vapor pressure solvent boiling between 150° to 225° C. for the bonding medium and being present in quantities sufficient to maintain the bonding medium tacky, laminating a formable base material and an ink transfer decoration with said bonding there between, said bonding medium being capable of withstanding a forming operation in set condition, removing the transfer backing, baking at substantially atmospheric pressure, and forming the ensemble.

17. In the art of manufacturing decorated objects the steps of: preparing a bonding medium carrying a low vapor pressure solvent boiling between 150° to 225° C. for the decoration and the bonding medium, and being present in quantities sufficient to maintain the bonding medium tacky, laminating a formable base material and a formable transfer decoration with the said bonding medium therebetween, said bonding medium being capable of withstanding a forming operation in set condition, removing the transfer backing from the decoration, baking the ensemble at substantially atmospheric pressure, and forming the ensemble.

18. In the art of manufacturing decorated objects the steps of: preparing a bonding medium containing a low vapor pressure solvent boiling between 150° to 225° C. for the decoration, laminating a base material and a decoration with said bonding medium interposed therebetween and in contact with the decoration, said bonding medium being any of the group of substances which includes cellulose ester and plasticizer, cellulose ester and plasticizer and resin, cellulose ester and resin, synthetic resin, resin and oil, and baking at substantially atmospheric pressure.

19. In the art of manufacturing decorated objects the steps of: preparing a base material to receive a bonding medium, preparing a decoration carrying a design lacking one color constituent, preparing a bonding medium of any of the group of substances which includes cellulose ester and plasticizer, cellulose ester and plasticizer and resin, cellulose ester and resin, synthetic resin, resin and oil, combining coloring matter with the bonding medium such as to provide that color constituent lacking from the design, combining a low vapor pressure solvent boiling between 150° to 225° C. for the bonding medium and for the decoration with the bonding medium, laminating the base material and the design bearing decoration with the colored medium interposed therebetween, and baking the ensemble at substantially atmospheric pressure.

20. In the art of manufacturing decorated objects the steps of: preparing a bonding medium comprising a body material and a low vapor pressure solvent boiling between 150° to 225° C. for the substance of the decoration, laminating a base material and a transfer decoration composed of any of the group of substances which includes ink, cellulose ester and plasticizer, cellulose ester and plasticizer and resin, cellulose ester and resin, synthetic resin, resin and oil, by interposing therebetween said bonding medium in contact with the decoration, removing the transfer backing, and baking the ensemble at substantially atmospheric pressure.

21. In the art of manufacturing decorated objects the steps of: preparing a bonding medium containing a low vapor pressure solvent boiling between 150° to 225° C. for the bonding medium, said solvent being present in quantities sufficient to maintain the bonding medium tacky, laminating a base material and an ink transfer by interposing said bonding medium therebetween in contact with the transfer, removing the transfer backing and baking the ensemble at substantially atmospheric pressure.

22. In the art of manufacturing decorated objects the steps of: laminating a base material and a decoration composed of synthetic resin by interposing therebetween a bonding medium comprising a body material and a low vapor pressure solvent boiling between 150° to 225° C. for the synthetic resin, and baking the ensemble at substantially atmospheric pressure.

23. In the art of manufacturing decorated objects the steps of: preparing a base material to receive a bonding medium, building up a decoration in a plurality of laminations, any of said laminations carrying a design and each of said laminations being composed of any of the group of substances which includes, ink, cellulose ester and plasticizer, cellulose ester and plasticizer and resin, cellulose ester and resin, synthetic resin, and resin and oil, preparing a bonding medium comprising a body material and a low vapor pressure solvent boiling between 150° to 225° C. for the substance of the decoration, laminating the base material and decoration by interposing the bonding medium therebetween, and by arranging the bonding medium and decoration in contact one with the other, and baking the ensemble at substantially atmospheric pressure.

24. In the art of manufacturing decorated objects the steps of: preparing a base material to receive a bonding medium, building up a decoration from a plurality of laminations, any of the laminations carrying a design, each of the laminations being composed of any of the group of substances composed of ink, cellulose ester and plasticizer, cellulose ester and plasticizer and resin, cellulose ester and resin, synthetic resin, and resin and oil, preparing a bonding medium comprising a body material and a low vapor pressure solvent boiling between 150° to 225° C. for the substances of the decoration and carrying a coloring matter compatible with the design of the decoration, laminating the base material and the decoration by interposing the bonding medium therebetween, and baking the ensemble at substantially atmospheric pressure.

25. In the art of manufacturing decorated objects the steps of: preparing a base material to receive a decoration, forming a design in any of a plurality of laminations composed of any of the group of substances which includes cellulose ester and plasticizer, cellulose ester and plasticizer and resin, cellulose ester and resin, synthetic resin, resin and oil, said design lacking a constituent color, building up said laminations to form a decoration, preparing a bonding medium carrying a low vapor pressure solvent boiling between 150° to to 225° C. for the substance of the decoration and carrying coloring matter such as to provide the constituent color lacking from the design, laminating the base material and the decoration by interposing the bonding medium therebetween, and baking the ensemble at substantially atmospheric pressure.

26. In the art of manufacturing decorated objects the steps of: preparing a formable base material to receive a bonding medium, preparing a formable transfer decoration composed of any of the group of substances which includes ink, cellulose ester and plasticizer, cellulose ester and plasticizer and resin, cellulose ester and resin, synthetic resin, resin and oil, preparing a bonding medium carrying a low vapor pressure solvent boiling between 150° to 225° C. for the substance of the decoration, said bonding medium being composed of any of the group of substances which includes cellulose ester and plasticizer, cellulose ester and plasticizer and resin, cellulose ester and resin, synthetic resin, and resin and oil, said bonding medium being formable in set condition, laminating the base material and the decoration by interposing the bonding medium therebetween and by arranging the decoration and the bonding medium in contact one with the other, removing the transfer backing, and baking the ensemble at substantially atmospheric pressure.

27. In the art of manufacturing decorated objects the steps of: preparing a bonding medium composed of synthetic resin and carrying a low vapor pressure solvent boiling between 150° to 225° C., said solvent being present in quantities sufficient to maintain the bonding medium tacky, laminating a formable base material and a formable transfer decoration composed of any of the group of substances which includes ink, cellulose ester and plasticizer, cellulose ester and plasticizer and resin, cellulose ester and resin, synthetic resin, resin and oil, by interposing said bonding medium therebetween in contact with the decoration, said bonding medium being formable in set condition, removing the transfer backing, and baking the ensemble at substantially atmospheric pressure, and forming the ensemble.

28. In the art of manufacturing decorated objects the steps of: preparing a bonding medium composed of a substance of the cellulose ester type, having embodied therewith a low vapor pressure solvent boiling between 150° to 225° C. for the substance of the decoration, said solvent being present in quantities sufficient to maintain the bonding medium tacky, laminating a formable base material and a decoration composed of any of the group of substances which includes ink, cellulose ester and plasticizer, cellulose ester and plasticizer and resin, cellulose ester and resin, synthetic resin, and resin and oil, by interposing said bonding medium therebetween, baking the ensemble at substantially atmospheric pressure.

29. In the art of manufacturing decorated objects the steps of: preparing a bonding medium having embodied therewith a low vapor pressure solvent boiling between 150° to 225° C. in quantities sufficient to maintain the bonding medium tacky, laminating a formable base material and a formable transfer decoration of the cellulose ester type by interposing therebetween a bonding medium being composed of any of the group of substances which comprises cellulose ester and plasticizer, cellulose ester and plasticizer and resin, cellulose ester and resin, synthetic resin, and resin and oil, said bonding medium being formable in set condition, removing the transfer backing, baking the ensemble at substantially atmospheric pressure and forming the ensemble.

30. In the art of manufacturing decorated objects the steps of: laminating a formable base material and a formable transfer decoration of the synthetic resin type by interposing therebetween a bonding medium carrying a low vapor pressure solvent boiling between 150° to 225° C. for the decoration, said medium being composed of any of the group of substances which includes cellulose ester and plasticizer, cellulose ester and plasticizer and resin, cellulose ester and resin, synthetic resin, resin and oil, said bonding medium being formable, removing the transfer backing, baking the ensemble at substantially atmospheric pressure, and forming the ensemble.

31. In the art of manufacturing decorated objects the steps of: preparing a bonding medium having embodied therein a low vapor pressure substance, boiling within the temperature range of 150° to 225° C. which maintains the bonding medium in a tacky condition indefinitely, laminating a formable base material and an ink transfer decoration with said bonding medium therebetween, said bonding medium being composed of any of the group of substances which includes cellulose ester and plasticizer, cellulose ester and plasticizer and resin, cellulose ester and resin, synthetic resin, resin and oil, said bonding medium being formable in set condition, removing the transfer backing, baking the ensemble at substantially atmospheric pressure, and forming the ensemble.

32. In the art of decorating, the steps of preparing a bonding medium containing a body material and a low vapor pressure solvent, uniting base materials and transfer decorations by interposing therebetween said bonding medium and by arranging said bonding medium and decoration in contact one with the other, said low vapor pressure solvents being any of the group of solvents which comprises butyl cellosolve, benzyl alcohol, butyl lactate and carbitol in quantities sufficient to maintain the bonding medium tacky, removing the transfer backing, and baking the ensemble at substantially atmospheric pressure.

33. The method of manufacturing decorated articles which comprises applying a prepared bonding medium to sheet metal, said bonding medium being prepared by embodying therein any of the group of solvents which comprises butyl cellosolve, benzyl alcohol, butyl lactate and carbitol in quantities sufficient to maintain the bonding medium tacky, eliminating the volatile constituents of the bonding medium excepting the said solvent, applying a transfer decoration in contact with the tacky bonding medium, removing the transfer backing, and baking the ensemble at substantially atmospheric pressure, said bonding medium and transfer being formable, and forming the ensemble.

THOMAS S. REESE.